United States Patent Office 2,722,626
Patented Nov. 1, 1955

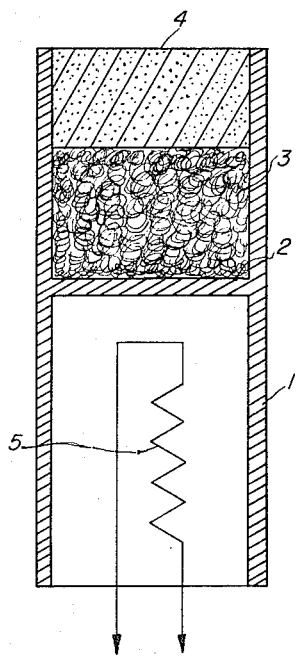
INVENTORS
PATRICK P. CAPPOLA
RAY C. HUGHES

2,722,626

THERMIONIC CATHODE

Patrick P. Coppola, Dobbs Ferry, and Ray C. Hughes, Ardsley, N. Y., assignors, by mesne assignments, to North American Philips Company, Inc., New York, N. Y., a corporation of Delaware Application February 16, 1953, Serial No. 337,022

7 Claims. (Cl. 313—346)

This application is a continuation-in-part of our application Serial No. 258,891, filed November 29, 1951, now U. S. Patent 2,700,118.

In our earlier application we have described and claimed cathodes which comprise pressed mixtures of a powdered refractory metal such as tungsten and selected alkaline earth compounds which upon heating react to furnish free alkaline earth metal to an electron-emissive surface of the cathode without deleteriously reacting with the refractory metal in a manner uproductive of free alkaline earth metal.

We have now found that we can make cathodes using alkaline earth compounds which would react with the refractory metals in a manner unproductive of free alkaline earth metal by incorporating in the mixture a suitable reducing agent. The reducing agent prevents reactions unproductive of free alkaline earth metal.

In particular we have found that we can form a cathode by mixing a powdered refractory metal such as tungsten with an alkaline earth carbonate or peroxide, which materials would ordinarily react directly with the refractory metal, forming no free alkaline earth metal, if we incorporate in the mixture as a reducing agent one or more of the following elements selected from group IV of the periodic table: carbon, silicon, titanium, or zirconium.

In our initial attempts to produce a cathode in which an alkaline earth carbonate, e. g., barium carbonate, was mixed with a powdered refractory metal such as tungsten we found that the cathode failed to activate or operate satisfactorily. We found that the carbonate, upon thermal decomposition, oxidized the tungsten and formed basic barium tungstate with substantially no production of free barium. We attributed this result to the fact that the carbon dioxide release during carbonate breakdown oxidized the tungsten and resulting tungsten oxide reacted with barium oxide to form the basic barium tungstate which is incapable of reacting further to produce free barium.

Our earlier efforts were directed to the replacement of barium carbonate by barium compounds which are incapable of reacting with the refractory metal in a manner unproductive of free barium. We have now found that we can use barium carbonate if we incorporate in the mixture a reducing agent which prevents the oxidation of the refractory metal during the decomposition of the carbonate. Consequently, we are able to make very inexpensive cathodes by mixing powdered refractory metal with an alkaline earth carbonate or peroxide and one or more of the above-mentioned elements and pressing the mixture into a cup of refractory metal. The cathode activates readily, high emission is obtainable, and the cathode has a long life.

In a preferred embodiment of our invention, we place a cap or wall of porous refractory metal over the mixture to limit the evaporation of alkaline earth metal.

The invention will be described with reference to the accompanying drawing in which the sole figure is an elevational view of a cathode according to the invention.

The cathode shown in the drawing is a preferred embodiment of our invention. It comprises a molybdenum sleeve 1, provided with a transverse partition 2 which forms a cup-shaped enclosure in which a mixture 3 of about 90% by weight of powdered tungsten and 10% by weight of barium carbonate or barium peroxide and carbon is disposed. The mixture is covered with a layer of powdered tungsten 4 which is sintered into a porous wall during activation of the cathode. The cathode is heated by means of a heater element 5 disposed in the lower portion of the sleeve and separated from the cathode by the transverse wall partition.

After activation at 1100° C. for 1 hour, the cathode had an emission density of about 4 amps./cm.$^2$ at 1000° C. and had a life of about 6000 hours.

Similar cathodes have been made employing mixtures of tungsten, barium peroxide and silicon, boron, titanium, tantalum and zirconium and have activated readily and operated satisfactorily.

While we have thus described our invention with specific examples and embodiments, other modifications thereof will be readily apparent to those skilled in the art without departing from the spirit and scope of our invention as defined in the appended claims.

What we claim is:

1. A thermionic cathode comprising a structure of refractory metal forming a cavity, a porous wall of refractory metal tightly closing said cavity, the pores of said wall constituting the largest passageways connecting the cavity to the outside of the cathode, a supply in said cavity of alkaline earth compounds decomposable upon heating to the corresponding alkaline earth oxides mixed with a refractory metal, and a supply of a reducing agent in said cavity consisting of an element selected from the group consisting of carbon, silicon, titanium, and zirconium.

2. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of barium carbonate mixed with a refractory metal, and a supply of a reducing agent in said cavity consisting of an element selected from the group consisting of carbon, silicon, titanium, and zirconium.

3. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of barium carbonate mixed with tungsten, and a supply of carbon in said cavity for reducing the barium carbonate to barium oxide without oxidizing the tungsten.

4. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of barium peroxide mixed with tungsten, and a supply of carbon in said cavity for reducing the barium peroxide to barium oxide without oxidizing the tungsten.

5. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of barium peroxide mixed with tungsten, and a supply in said cavity of a reducing agent selected from the group consisting of silicon, carbon, titanium, and zirconium.

6. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of an intimate mixture of about 90% by weight of tungsten and about 10% by weight of barium carbonate and carbon.

7. A thermionic cathode comprising a structure of refractory metal forming a cavity, a porous wall of refractory metal tightly closing said cavity, the pores of said wall constituting the largest passageways connecting the cavity to the outside of the cathode, and a supply in said cavity of an intimate mixture of about 90% by weight of tungsten and about 10% by weight of barium peroxide and carbon.

References Cited in the file of this patent

UNITED STATES PATENTS

| | | |
|---|---|---|
| 1,716,545 | Mackay | June 11, 1929 |
| 1,846,242 | Alexander | Feb. 23, 1932 |
| 1,922,244 | Hunter, Jr. | Aug. 15, 1933 |
| 2,121,589 | Espe | June 21, 1938 |
| 2,175,345 | Gaidies et al. | Oct. 10, 1939 |
| 2,543,728 | Lemmens | Feb. 27, 1951 |
| 2,624,024 | Jansen et al. | Dec. 30, 1952 |

OTHER REFERENCES

Reprint from Philips Technical Review, vol. II, No. 12, June 1950, pp. 341–350.